March 29, 1960
J. J. KOSACH
2,931,012
SINGLE WHEEL SKATE
Filed Dec. 16, 1957
2 Sheets-Sheet 1
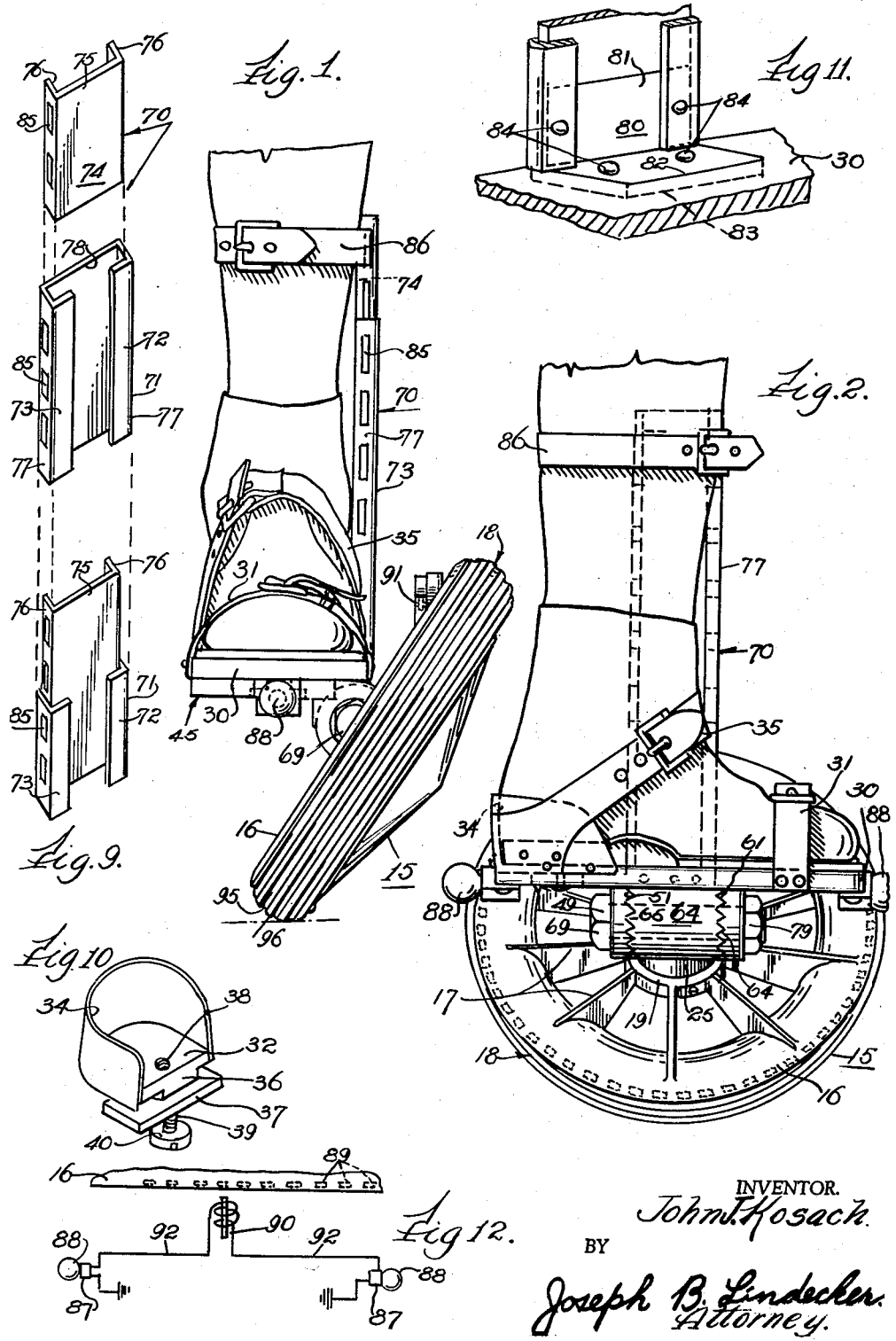
INVENTOR.
John J. Kosach
BY
Joseph B. Lindecker
Attorney

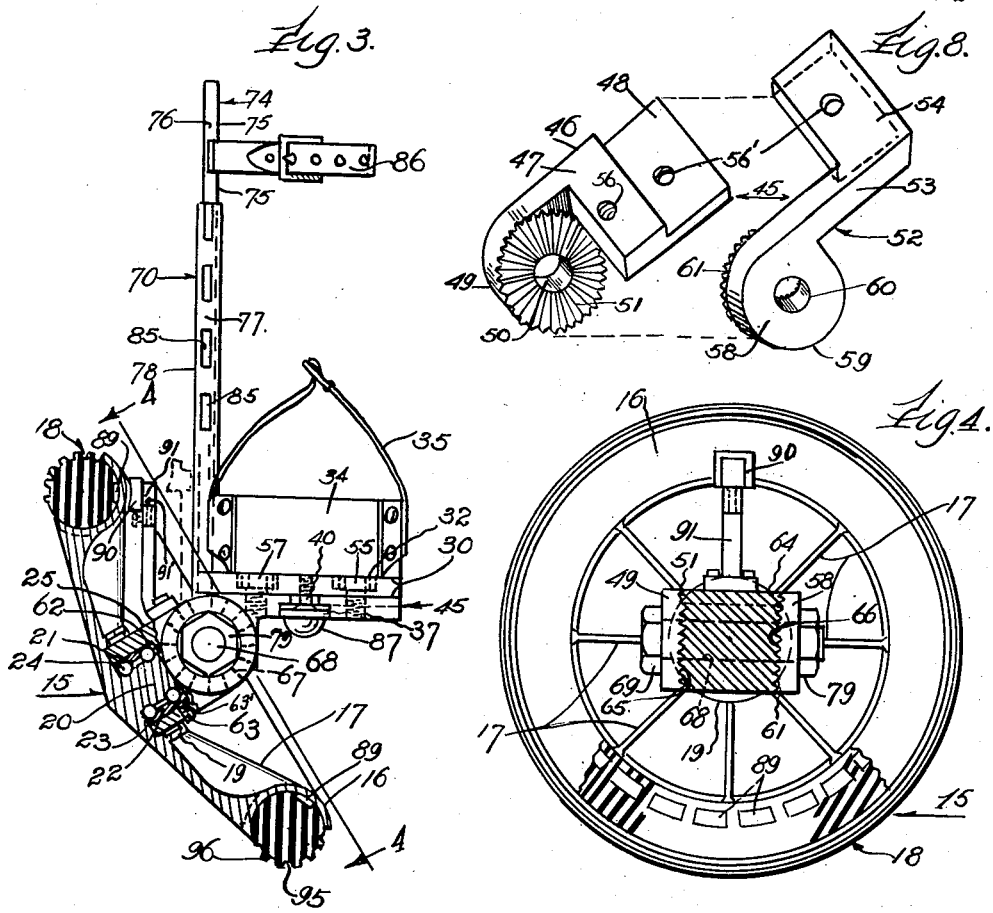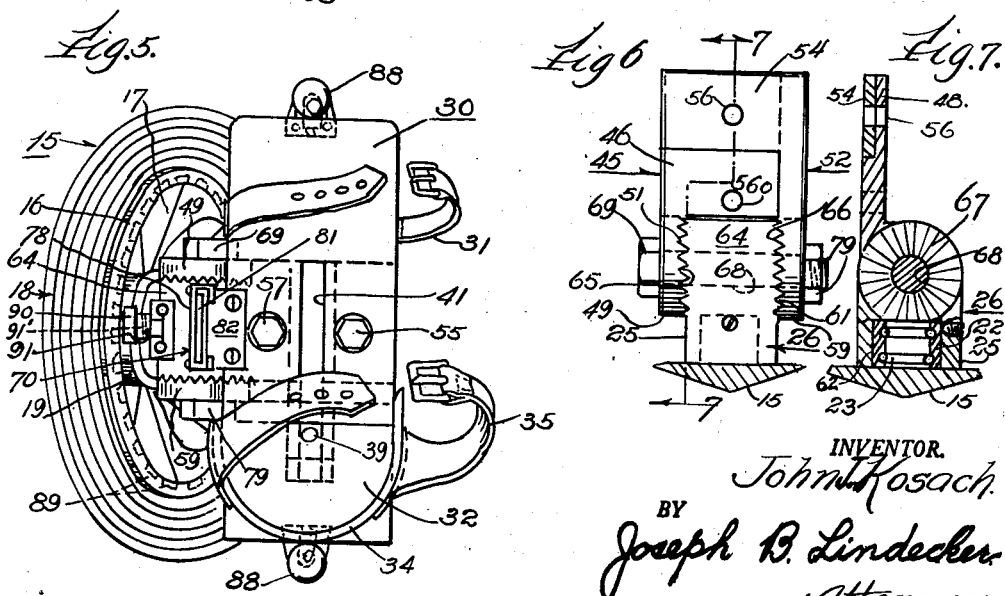

United States Patent Office 2,931,012
Patented Mar. 29, 1960

2,931,012

SINGLE WHEEL SKATE

John J. Kosach, Chicago, Ill.

Application December 16, 1957, Serial No. 703,004

5 Claims. (Cl. 340—81)

This invention relates to a vehicle and more particularly to a single wheel skate for use on roads, sidewalks, rinks and the like.

The invention embraces the provisions of a vehicle, or a single wheel skate which may be attached to the feet of a person whereby the person can more easily make turns than upon the multiple wheel type vehicles;

An object of the invention is the provision of a single wheel skate of light weight construction particularly adapted for skaters upon which they may travel at greater speeds with greater safety and comfort than on those which are now in general use;

Another object of the invention is the provision of a single wheel skate which is adjustable, affording sufficient room for the skater's foot and at the same time allowing the wheel to be set at the smallest possible inclination to the vertical;

Another object of the invention is the provision of a single wheel skate which is adjustably mounted with the foot supporting member of the skate allowing the wheel to be set at any inclination with the vertical according to the ability of the skater and the speed desired to be obtained by the skater;

Another object of the invention is the provision of a single wheel skate embodying a metallic foot support, a metallic vertical channel shaped upright lower extension member rigidly connected thereto, a metallic channel-shaped hollow upper extension member slidably mounted with the lower extension member, transverse lateral slots provided in the front and rear portions of the extension members whereby the holding straps may be inserted therethrough for securing the extension members to the leg of the skater;

A further object of the invention resides in the construction of a single wheel skate designed for the reception of a solid rubber tire, or a pneumatic tire, of desired diameter of the tire to suit the requirements of different skaters or other special services for which the wheel is desired, and the tire having a plurality of permanent magnets embedded in the exterior surface of the inner side wall whereby they may pass in close proximity with an electrical pick-up coil supported at the outer end of an arm extending outwardly and upwardly from the foot support of the skate to provide electric current;

A further object of the invention resides in the embodiment of an electric light bulb at the front and rear end of the foot support of a single wheel skate, the bulbs connected by wires in series with an electric pick-up coil supported adjacent the revolving wheel, or tire, having a plurality of permanent magnets embedded therein, whereby the movement of the magnets past the pickup coil effects a continuous flash of light, the duration of the flash depending, obviously, upon a substantially continuous movement of the wheel and tire thereon; and A still further object of the invention resides in a single wheel skate where a relatively large diameter wheel is supported by the foot support plate, the plate suspended above the axis of said wheel providing relatively smooth operation of the skate over uneven surfaces;

Further objects and advantages are within the scope of this invention such as relate to the arrangement, operation and function of the related elements of the single wheel skate, to various details of construction and to the combination of parts, elements per se, and to economies of manufacture and numerous other features as will be apparent from a consideration of the specification and drawing of a form of the invention, which may be preferred, in which:

Figure 1 is a view in front elevation of a skate constructed in accordance with an embodiment of my invention and in applied position;

Figure 2 is a view in side elevation of the skate as disclosed in Figure 1 and in applied position;

Figure 3 is a view in front elevation of the skate as disclosed in Figures 1 and 2 unapplied, and with the wheel and supporting means shown in section;

Figure 4 is a detail sectional view taken substantially on line 4—4 of Figure 3;

Figure 5 is a top plan view of the skate as disclosed in Figures 1 and 2 unapplied;

Figure 6 is a fragmentary detail view showing a portion of the wheel attached to the suspension arm which is pivotally mounted with the transverse supporting bar member of the skate;

Figure 7 is a detail sectional view taken substantially on line 7—7 of Figure 6;

Figure 8 is an exploded perspective view of the transverse supporting bar member of the skate disclosing the jaws thereof with arcuate ribs;

Figure 9 is a fragmentary exploded perspective view of the leg support channel members of the skate shown in Figures 1 and 2;

Figure 10 is a perspective view of the heel socket and associated parts of the skate shown in Figures 1 and 2;

Figure 11 is a fragmentary perspective view of a portion of the leg support member secured to an L shaped bracket mounted with the foot support of this invention; and Figure 12 is a schematic diagram showing the electric wiring associated with a pickup coil, bulbs and magnets associated therewith.

While I have illustrated a form of my invention as embodied in a single wheel skate, it is to be understood that I contemplate the application of the principles of my invention to any one wheel form of vehicle.

Referring to the drawings in detail, the vehicle construction illustrated is inclusive of an inclined single dial shaped wheel 15 comprising a ring portion 16, rib portions 17, a pneumatic or other suitable type tire 18, the central portion of the wheel provided with a hub portion 19 and axle shaft 20. The axle shaft 20 is provided with two circular grooves to provide ball races 21. A bearing ring 22 provided with two annular grooves to provide ball races 23 is assembled upon said axle shaft 20. Ball bearings 24 are inserted between the races 21 and 23 to serve, in the usual manner, to reduce friction between the hub portion 25 of suspension arm 26 and the axle shaft 20, upon which the wheel 15 is free to turn.

A foot-plate 30 of substantially rectangular configuration is provided with suitable straps, or clamping devices, to fasten the skate to the foot of the wearer. The forward end of the foot-plate 30 is provided with a strap 31 which may be properly engaged over the toe portion of the foot of the user. The rearward end of the foot-plate has assembled therewith the usual heel-plate 32 formed of metal with a back plate 34 preferably formed with metal portions and a strap 35 which may be properly engaged over the instep portion of the foot of the user. The heel-plate 32 is formed with a downwardly extending longitudinal flange portion 36. Associated with the heel-plate 32 is a detachable plate 37, both said heel-plate and said detachable plate 37 being provided with a centrally positioned bore. The bore 38 in the heel-plate 32 is threaded to receive the threaded end portion 39 of locking bolt 40 clearly shown by Figure 10.

The central portion of the foot-plate 30 preferably of metal, comprises a slot 41, centrally located and which extends rearwardly so as to be located beneath the heel-plate 32. The slot 41 is of inverted T shape configuration, the base portion being wide enough to receive the detachable plate 17. When the heel-plate 32 is assembled with the foot-plate 30, the locking bolt 40 holds the detachable plate 37 in slot 41 and is threaded into the heel-plate bore 38 to adjustably secure the heel-plate in any desired location between the rear end and the mid-section of the foot-plate as desired.

Attached to the foot-plate 30 at substantially the midsection thereof, and transversely thereof, is bolted a two-piece supporting arm 45, said arm clearly shown by Fig. 8. Said arm is composed of a one section 46 having a top flat portion 47 and a rearwardly extending section 48 of reduced thickness, the forward end of said section 46 being provided with a vertically extending bracket arm 48 having a circular end portion 49 with a central horizontally arranged bore 50. The inner vertical face of said end portion 49 is provided with radially extending ribs, or V shaped teeth 51. The section 52 of said arm 45 is provided with a side portion 53, a rearward flat section 54 proportioned to fit over the rearward section 48, the combined thickness of sections 48 and 54 being equal to the thickness of the flat portion 47 of section 46. Sections 54 and 48 are each provided with a centrally located bore 56', which are in direct alignment with each other to receive a bolt 55. The forward flat portion 47 of section 46 is also provided with a bore 56 to receive a bolt 57. The foot-plate 30 is provided with two threaded apertures in desired location to receive the threaded ends of locking bolts 55 and 57 to rigidly secure the supporting arm 45 transversely therewith. The second section 52 of said arm 45 is provided at the forward end thereof with a vertically extending bracket arm 58 having a circular end portion 59 with a central horizontally arranged bore 60, the inner vertical face of said end portion 59 being provided with radially extending ribs, or V shaped teeth 61.

The suspension arm 26, as shown by Figures 6 and 7, embodies a cylindrical hub portion 25 to receive the bearing ring 22 within a bore 62 thereof. An "Allen set-screw" 63 is inserted within a threaded bore 63' in the side wall of the hub portion 25 to lock said ring 22 in assembled relation therewith. Since the bearings 24 and ring 22 are assembled upon the axle shaft 20, said set screw 63 locks the shaft within the suspension arm 26. The opposite end of said suspension arm 26 is provided with an extending male portion 64 with vertical side walls 65 and 66. The side walls 65 and 66 are provided with radially extending ribs, or V shaped teeth 67 that are complementary to the V shaped teeth 51 and 61. The male portion 64 is provided with a central horizontally arranged bore 68 for the reception of a bolt 69, clearly shown by Figures 2, 4 and 6.

The assembly and adjustment of the suspension arm 26 with the supporting arm 45 is accomplished by inserting the male portion 64 between the vertical bracket arms 48 and 58, the central bore 68 being alinged with bore 50 and 60 in said bracket arms 48 and 58, and then bolt 69 is inserted therethrough, nut 79 applied thereby clamping and locking the V shaped teeth 51, 61 and 67 of the parts into tight engagement, thereby locking said suspension arm 26 with said supporting arm 45. After said parts are assembled, the supporting arm is bolted to the foot-plate by bolts 55 and 57, whereby the wheel 15 is suitably and adjustably assembled together in an inclined plane relative to and with the foot-plate 30.

The skate embodies a leg supporting member 70, said member 70 composed of a lower channel member 71 with inwardly turned flanges 72 and 73. The upper channel member 74 is formed with a front wall 75 and two rearwardly extending side walls 76. The lower member 71 comprises side walls 77 and a rear wall 78. The upper member 74 is telescopically assembled within the lower member 71 with close sliding engagement therewith, whereby the upper member may be raised or lowered to obtain the desirable height required by the user. The lower member 71 is rigidly secured to the foot-plate 30 by being rigidly secured to the upwardly extending portion 80 of an angle plate 81, the horizontal portion 82 thereof being secured to the foot-plate 30, provided with a recessed portion 83, by bolts or rivets 84. The channel members have vertical slots 85 arranged at equal distances apart and complementary with each other. A leg strap 86 is adapted to be inserted through slots 85 in opposite side walls of either member for attachment to the leg of a user, as shown by Fig. 3. Due to the alignment of the slots in both the upper and lower members, the strap 86 may be placed through two slots in the lower member, also through two slots in the upper member aligned therewith and about the leg of the user when in use. Said arrangement through both upper and lower members will also serve to lock the parts together when not in use. When the strap 86 is used, as shown by Fig. 3, only through the upper member and about the leg of the user, the upper and lower members are maintained together by the close fitting relationship therewith. As clearly shown by Figure 9, the front wall 75 of the upper member slides in contact with the inwardly turned flanges 72 and 73 of the lower member.

The foot-plate 30 is provided with a light socket 87 and electric light bulb 88 at each end thereof. In order to provide electric current for said bulbs and obtain light as desired, a plurality of permanent magnets 89 are arranged in the peripheral edge portion of the inner wall of the tire 18, as shown by Figures 3 and 5. A pick-up coil 90 is pivotally supported upon a horizontal pin 91' at the upper end of a coil supporting arm 91, the lower end of said arm 91 bolted to the upper surface of the suspension arm 26, as shown by Figure 3. When the coil 90 is horizontally arranged, the outer face thereof is positioned and maintained very close to the magnets. When the wheel is rotated and the magnets pass by the pick-up coil, electric current is generated thereby and conducted by suitable wire 92 to the lamp sockets 87, the lamp sockets and coil being connected in series as diagrammatically shown by Figure 12. The magnets 89 are usually molded in the tires.

The tire 18 is provided with a plurality of circumferential grooves 95 and outstanding ribs 96, the ribs 96 extending to the inner side wall of the tire to prevent surface slipping of the tire when the wheel is normally adjusted and arranged at an angle more closely approaching the horizontal. The normal and most desirable angle of the wheel to obtain greater speed appears to be approximately 60° with the horizontal, placing the tire contact surface with the road directly below and in vertical alignment with the vertical axis of the leg of the user.

When the skate is in use during the daytime and it is not desirable to have current pass through the bulbs, which may burn out the bulbs due to excessive use, the pick-up coil can be turned vertically, away from the tire and magnets molded therein. The movement of the magnets past the pick-up coil effects a repetitious flashing of light from the bulbs, the rapidity of the flashes depending upon a substantially continuous movement of the wheel and tire thereon.

In the construction thus described, it will be seen that the heel-plate can be adjusted longitudinally of the skate to satisfy the desired length of the user according to shoe size.

When it is desired to change the inclination of the wheel relative to the vertical, the supporting arm is easily unbolted from the foot-plate 30 and the arms 65 and 66 separated after removal or loosening of bolt 69 therefrom, allowing the suspension arm to be positioned at any desired angle. Tightening of the bolt 69 and nut 79 and reassembly of the supporting arm to the skate, again places the skate in condition for use and always at a level below the foot plate.

In view of the fact that the axle shaft can be assembled with suitable bearing means to the downwardly extending suspension arm and becomes a closed complete unit of the skate, it seems clear that the bearings can be satisfactorily lubricated and maintained in the same condition, thus avoiding wear and misalignment of the parts, providing an exceptionally heavy duty wheel construction and desirable skate.

While it will be apparent that the illustrated embodiments of my invention herein disclosed are well calculated to adequately fulfill the objects and advantages primarily stated, it is to be understood that the invention is susceptible to variations, modifications and change within the invention comprehending all variations thereof.

I claim as my invention:

1. In a vehicle of the class described the combination of an inclined single wheel, an axle shaft extending upwardly and angularly from one side of said wheel, a suspension arm in connection with said axle shaft and extending outwardly from said wheel, a foot-plate supported by suitable means at the upper end of said suspension arm and above the axis of said wheel, light bulbs mounted upon opposite ends of said foot-plate, said suspension arm adjustably and angularly mounted in connections secured with said foot-plate, an upwardly extending supporting arm associated with said suspension arm, a pick-up coil rotatably assembled normally at one side of and at the upper end of said supporting arm, a rubber tire assembled upon the periphery of said wheel, a plurality of permanent magnets assembled with said tire, said magnets arranged to pass said pick-up coil in normal position in close proximity therewith when said wheel revolves, whereby said pick-up coil connected by a suitable electric circuit with said light bulbs mounted upon said foot plate will effect repetitious flashes of light from said light bulbs.

2. In a vehicle of the class described the combination of an inclined single wheel, an axle shaft extending upwardly and angularly from one side of said wheel, a suspension arm in connection with said axle shaft and extending outwardly from said wheel, a foot-plate supported by suitable means at the upper end of said suspension arm and above the axis of said wheel, light bulbs mounted upon the forward and rear ends of said foot-plate, said suspension arm adjustably and angularly mounted in connections secured with said foot-plate, an upwardly extending supporting arm associated with said supporting arm, a pick-up coil rotatably assembled normally at one side of and at the upper end of said supporting arm, a rubber tire assembled upon the periphery of said wheel, a plurality of permanent magnets assembled in the exterior surface of the inner wall of said tire, said magnets arranged to pass said pick-up coil in close proximity therewith when said wheel revolves, whereby said pick-up coil connected by a suitable electrical circuit with said light bulbs mounted upon said foot plate will effect repetitious flashes of light from said light bulbs.

3. In a vehicle of the class described the combination of an inclined single wheel, an axle shaft extending upwardly and angularly from one side of said wheel, a suspension arm in connection with said axle shaft and extending outwardly from said wheel, a foot plate supported by suitable means at the upper end of said suspension arm and above the axis of said wheel, light bulbs mounted upon the front and rear ends of said foot-plate, said suspension arm adjustably and angularly mounted in connections secured with said foot-plate, a vertical upwardly extending coil supporting arm mounted upon said suspension arm, a pick-up coil rotatably and normally assembled at the one side of and at the upper end of said coil supporting arm, a rubber tire assembled upon said wheel, a plurality of permanent magnets assembled in the outer periphery of the inner side wall of said tire, said magnets arranged to pass said pick-up coil in normal position in close proximity therewith when said wheel revolves, whereby said pick-up coil connected by a suitable electric circuit with said light bulbs mounted upon said foot-plate will effect repetitious flashes of light from said light bulbs when in said normal position and preventing the generation of electric current and flashes of light when rotated and arranged above said coil suspension arm at a distance from said magnets in said rubber tire.

4. An inclined single wheel road skate consisting of the combination of a dish-shaped wheel and rubber tire thereon, permanent magnets molded in the external surface of the inner wall of the tire, a pick-up coil supported adjacent the magnets, and upwardly and angularly wheel supporting arm, a foot-plate assembled with and at the upper end of said supporting arm above the axis of said wheel and light bulbs mounted upon the forward and rear end of said foot-plate and connected with said pick-up coil by suitable wires whereby light flashes are repetitiously effected from said light bulbs.

5. An inclined wheel road skate consisting of the combination of a dish-shaped wheel and a rubber tire thereon, permanent magnets assembled in the inner side wall of said tire, an axle shaft extending angularly and upwardly from the inner side of said wheel, a suspension arm in connection with said axle shaft and extending outwardly and upwardly from said wheel, a foot-plate supported horizontally at the upper end of said suspension arm, light bulbs mounted upon the forward and rear ends of said foot-plate, a supporting bar member arranged transversely of the skate and secured to the bottom of said foot-plate adjacent the midsection thereof, said suspension arm adjustably mounted by suitable connections to one end of said supporting bar member, an adjustably mounted coil supporting arm extending vertically and upwardly from said suspension arm, a pick-up coil rotatably assembled in a normal position at one side and at the outer end of said coil supporting arm, said magnets in said tire arranged to pass said pick-up coil in normal position and in close proximity therewith when said wheel revolves, whereby said pick-up coil connected by a suitable electrical circuit with said light bulbs mounted upon said foot-plate will effect a source of electrical energy to be conveyed thereto and effecting repetitious flashes of light therefrom and will prevent flashes of light when it is in rotated position above said coil supporting arm.

References Cited in the file of this patent

UNITED STATES PATENTS

| | | |
|---|---|---|
| 572,403 | Bond | Dec. 1, 1896 |
| 1,165,082 | Finnigan | Dec. 21, 1915 |
| 2,140,224 | Galgoczy | Dec. 13, 1938 |
| 2,299,762 | McDermott | Oct. 27, 1942 |
| 2,502,566 | Hooley | Apr. 4, 1950 |
| 2,675,243 | King | Apr. 13, 1954 |